United States Patent [19]

Akao

[11] Patent Number: 4,653,640

[45] Date of Patent: Mar. 31, 1987

[54] PACKAGING MATERIALS FOR PHOTOSENSITIVE MATERIALS AND PROCESS FOR PRODUCING SAME

[75] Inventor: Mutsuo Akao, Minami-Ashigara, Japan

[73] Assignee: Fuji Photo Film Co., Ltd., Kanagawa, Japan

[21] Appl. No.: 773,059

[22] Filed: Sep. 6, 1985

[30] Foreign Application Priority Data

Sep. 7, 1984 [JP]  Japan .................. 59-186259

[51] Int. Cl.$^4$ .................. B65D 65/40; G03C 3/00
[52] U.S. Cl. .................. 206/455; 156/177; 156/179; 156/290; 206/524.2; 229/3.5 R; 229/3.5 MF; 383/113; 383/116; 383/117; 383/908; 428/35; 428/134; 428/138; 428/200; 428/215; 428/218; 428/220; 428/247; 428/339; 428/461; 428/516; 428/910
[58] Field of Search .................. 206/455, 524.2; 229/3.5 R, 3.5 MF; 383/113, 116, 117, 908; 428/35, 134, 138, 200, 215, 218, 220, 247, 339, 461, 516, 910; 156/177, 179, 290

[56] References Cited

U.S. PATENT DOCUMENTS

| | | | |
|---|---|---|---|
| 3,322,613 | 5/1967 | Rasmussen | 428/518 |
| 3,445,055 | 5/1969 | Port et al. | 428/226 |
| 3,816,230 | 6/1974 | Carreras et al. | 428/475.5 |
| 3,973,063 | 8/1976 | Clayton | 428/167 |
| 4,034,375 | 7/1977 | Wallin | 428/922 |
| 4,101,359 | 7/1978 | Failliot | 428/247 |
| 4,147,291 | 4/1979 | Akao et al. | 428/461 |
| 4,258,848 | 3/1981 | Akao et al. | 206/524.2 |
| 4,331,725 | 5/1982 | Akao | 428/319.9 |
| 4,513,050 | 4/1985 | Akao | 428/408 |

*Primary Examiner*—James C. Cannon
*Attorney, Agent, or Firm*—Burns, Doane, Swecker & Mathis

[57] ABSTRACT

A packaging material for photosensitive materials comprising a laminate of at least three layers comprising thermoplastic resin bonded fabric of the mesh structure and flexible sheet layers laminated on both sides thereof, wherein:

(a) said thermoplastic resin bonded fabric of the mesh structure has a mean thickness of 0.01 to 1.3 mm, (b) said thermoplastic resin bonded fabric of the mesh structure has an aperture ratio of 15% to 98%, (c) said laminate including one or two or more light-shielding layers, and (d) only one layer of said flexible sheet layers on both sides of said thermoplastic resin bonded fabric of the mesh structure is applied with an adhesive layer, and the other (opposite) flexible sheet layer is bonded and laminated over at least 10% of the overall area through the apertures or meshes in said fabric.

17 Claims, 21 Drawing Figures

PACKAGING MATERIALS FOR PHOTOSENSITIVE MATERIALS AND PROCESS FOR PRODUCING SAME

FIELD OF THE INVENTION

The present invention relates to a laminate suitable for packing, especially (photographic) photosensitive materials and a process for producing same.

BACKGROUND OF THE INVENTION

Various types of laminates are practically used in wider fields, and are demanded to possess diverse properties according to their use. The properties required for packaging laminates including those for (photographic) photosensitive materials be that they are difficult to tear and curl, high in impact strength, flexible, hard to generate static electricity, easily heat-sealable for sealing and moisture-proof as well as have gas barrier properties, etc. If it is possible to realize a difficult-to-curl, seal-packagable and inexpensive laminate to which improved tear strength, Gelbo test strength, drop strength and impact strength are afforded without any deterioration of some properties such as cushioning, flatness and slip properties, there would be new applications such as the application thereof to the packaging of photographic photosensitive materials which have so far been transported in sealing containers of metals. In addition, many practical advantages would be attained such as desired control of moistureproofness and gas barrier properties, reductions in the weight of packages, prevention of failure of packages, etc. Such packaging materials are disclosed by the present inventors in U.S. Pat. No. 4,331,725.

SUMMARY OF THE INVENTION

Objects of the present invention are to improve such packaging materials, and to provide an inexpensive and practical packaging material for (photographic) photosensitive materials and a process for producing same.

The present invention provides a packaging material for (photographic) photosensitive materials characterized by comprising a three- or more-layer laminate in which flexible sheet layers are laminated on both sides of a thermoplastic resin bonded fabric of mesh structure (e.g., WARIFU manufactured by Nisseki Kagaku Co., Ltd.), said bonded fabric having a mean thickness of 0.01 to 1.3 mm and an aperture ratio of 15 to 98%, only one of said two flexible sheet layers being applied with a thermoplastic resin adhesive layer for lamination, and one or more of said layers of said laminate being a light-shielding layer or layers.

The thermoplastic resin bonded fabric of the mesh structure (or the porous cross-laminated fabric) used in the present invention is formed of various types of thermoplastic resins such as olefinic polymers such as polyethylenes, polypropylenes, polystyrene, polybutene, polyisobutylene, etc., olefinic copolymers such as ethylene-propylene copolymers, ethylene-butene copolymers, ethylene-vinyl acetate copolymers (EVA), ethylene-ethyl acrylate copolymers (EEA), etc., copolymers composed mainly of propylene, or polyamide, polyacetal, polyvinyl chloride (PVC), polyvinylidene chloride (PVDC), polycarbonate polyethylene terephthalate (PET), polyphenylene oxide, etc., or mixtures of two or more thereof. Preferred resins for the thermoplastic resin bonded fabric of the mesh structure (hereinafter referred to as the porous cross-laminated fabric) are thermoplastic resins containing as the main component various types of polyolefin resins, especially polyethylene resins (LDPE, MDPE, HDPE, L-LDPE), and polypropylene resins (homopropylene, block propylene, random propylene, atactic propylene isotactic propylene).

Referring to the typical process for producing the porous cross-laminated fabrics, there is a split process developed by Kobunshi Kako Kenkyu Kai (High-Molecule Processing Research Association) and put to practical use by Nisseki Kagaku Co., Ltd.

The steps applied prior to the split process that is the typical process for producing the porous cross-laminated fabrics are: film formation by the inflation process (if required, the film may be formed with a flat T-die)-stretching-fiber mesh making by widening and splitting.

The widened and split fiber mesh is uniformly spread, fixed, and intersected crosswise to form bonded (cross-laminated) fabric. The intersections may be bonded by the application of heat-sealing and adhesives (lamination, press adhesion or the like).

With the split process, it is possible to mass-produce at low costs thin bonded fabrics having a basis weight of about 5 to 15 g/m$^2$, which have so far been considered not possible to be produced.

One drawback of that type of cross-laminated fabric is that, when heated at 350° C. or higher for 0.5 seconds or longer, there is a marked drop of strength due to the destruction of the bonding forces allowing the intersections to be bonded. For that reason, to reduce the time and frequency for and with which the fabric is allowed to be exposed to heat is important to prevent lowering of the physical strength properties (tear strength, impact fracture strength, etc.), the light-shielding properties, etc.

Thus, when preparing the laminated of the present invention, it is desired that the resin temperature at the time of extrusion of the thermoplastic resin adhesive layer be 350° C. or lower, and, after coming in contact with the thermoplastic resin bonded fabric of the mesh structure (the porous cross-laminated fabric or which may be referred to as "net layer" hereinafter), it be allowed to be in contact with a cooling device (e.g., a cooling roll) of 50° C. or lower within 0.5 seconds for bonding.

In order to avoid thermal deterioration at the time of heat-sealing, it is desired that the melting point of the thermoplastic resin forming the cross-laminated fabric be higher than that of the resin of the heat-sealed layer by at least 10° C.

In accordance with the present invention, the thermoplastic resin adhesive layer is applied on only one flexible sheet layer of the net layer, and the other flexible sheet layer is laminated thereon with the adhesives penetrating through the apertures in the cross-laminated fabric. This makes it possible to reduce the time and frequency from and with which the fabric is exposed to heat to a half of those required in the prior art, and brings the physical strength to three to four times as much as that of the conventional product, since the laminate is not made integral in the mesh portion, leaving behind spaces. In addition, there is an advantage in view of the production step.

1: Thermoplastic resin bonded fabric (porous cross-laminated fabric)

2,2a,2',2'a: Flexible sheet layers (the letter a stands for layers containing a light-shielding substance).

2'',2''a: Metal-deposited flexible sheet layers (aluminum-deposited paper, aluminum-deposited film, etc.)

3: Adhesive layer

3': An adhesive layer formed from the adhesive layer 3 through the apertures or meshes in the fabric 1.

4,5: Heat-sealing layers

K: Apertures or meshes in the fabric 1

L: Fibrous portion of the fabric 1

6: Heat-resistant flexible sheet layer

7: Heat-sealed portion (by heat-sealing or adhesives, etc.)

8: Photographic photosensitive material

9: Adhesive seal

10: Seal by sealing means such as sealing tapes or labels, etc.

PREFERRED EMBODIMENTS OF THE INVENTION

The porous cross-laminated fabric used as the packaging material for photographic photosensitive materials according to the present invention has preferably a (mean) thickness of 0.01 to 1.3 mm, more preferably 0.03 to 0.9 mm.

In a thickness of 1.3 mm or more, difficulty is involved in the production of porous cross-laminated fabrics, and the amount of resin to be used increases with an attendant increase in the price. Besides, there is the need for increasing the amount of adhesives for lamination on both sides of the net layer, and a number of problems arise such as a lowering of the application rate in adhesives, a rise in the material cost, a variation in bonding strength, a drop of flatness, a need of increasing the rigidity of laminates, etc. Thus, it is difficult to practically use the porous cross-laminated fabrics having such a thickness. In a thickness of 0.01 mm or less, on the other hand, the strength of the cross-laminated fabrics is small, and the net layer does not sufficiently produce its own effect. Besides, a number of problems arise such as the absence of any stiffness, and the presence of large curling, and low Gelbo test, tear and impact perforation stength. In addition, at the time of the production of porous cross-laminated fabrics and the lamination of flexible sheets thereon, there are failure and aperture breakage, and the distortion of meshes takes place.

In view of efficient formability, the apertures (meshes) are generally in the square, rectangular, rhombic or varied form, as illustrated in FIGS. 7 to 19. The warp and weft fibers used have usually a substantially equal thickness, but may be different in thickness depending upon the shape and purpose of the meshes.

In the present disclosure, the aperture ratio is expressed in terms of the following equation:

$$\text{aperture ratio} = \frac{\text{Area of the apertures in unit area}}{\text{Unit area of sheet}} \times 100$$

In the present invention, the aperture ratio is 15 to 98%, preferably 25 to 85%, and most preferably 35 to 80%.

In an aperture ratio of 15% or less, when an adhesive layer is applied on only one of the flexible sheet layers laminated on both sides of the cross-laminated fabric layer, an area, over which the adhesive layer is bonded to the other flexible sheet layer through the apertures therein, tends to be reduced so that failures such as interlaminar separation tend to occur. In addition, the thickness of the fibers increases with an increase in the irregularity in the laminate, so that stress mark, wear and press mark occur in photographic photosensitive materials. Thus, it is difficult to obtain any practical laminates.

In an aperture ratio of 98% or higher, on the other hand, the strength of porous cross-laminated fabrics drop so that, at the time of the production thereof, they break and crack frequently. The resulting laminates are not improved in respect of tear strength, impact perforation strength, Gelbo test strength, etc. with the result that the desired purpose is not attained.

The self-shape supporting property and non-collapsing degree of the cross-laminated fabrics should be selected in view of convenience at the time of the production of those fabrics and laminates, and improvements in the strength of the laminates formed as packaging materials, and the tensile strength thereof should be 4 kg/5 cm to 55 kg/5 cm.

$$\frac{\text{Mean longitudinal length + mean lateral length of sides of meshes of the cross-laminated fabric}}{2}$$

is 0.25 to 30 mm, preferably 0.5 to 20 mm, and most preferably 1.3 to 10 mm. When that value is 0.25 mm or lower, the same problems as referred to in the case that the aperture ratio is 15% or less arise, whereas, when that value is 30 mm or more, the same problems as referred to in the case that the aperture is 98% or higher arise.

The flexible sheet layers to be laminated on both sides of the porous cross-laminated fabric may be identical or different.

Typical examples of the flexible sheet layers include those formed of various types of paper, synthetic paper, aluminum-deposited paper, aluminum-deposited films, metal foils such as aluminum foils, tin foils, iron foils, etc., bonded fabrics, crossyarn, cellophane (trade name), cloth, and films formed of various types of thermoplastic resins such as polyethylenes (LDPE, MDPE, HDPE, L-LDPE), polypropylenes, cellulose triacetate, polyester, polyamides (nylon-66, nylon-6, etc), polycarbonate, polyvinylidene chloride, polyvinyl chloride, polystyrene, or copolymers containing as the main component the aforesaid polymers, such as EVA, EEA, etc., or mixtures of two or more of these thermoplastic resins. In view of cost, availability, general-purpose properties and productivity, preference is given to films formed of polyethylene terephthalate (PET), high-density polyethylene (HDPE), medium-density polyethylene (MDPE), high-pressure-processed low-density polyethylene (LDPE), low-pressure-processed linear low-density polyethylene (L-LDPE) and polypropylene (PP), and more preference is given to films formed of L-LDPE or a high-density polyethylene having a density of 0.94 g/cm$^3$ or higher. Effectively, these thermoplastic resin films may be uniaxially or biaxially molecularly-oriented.

Detailed reference will now be made to the uniaxially molecularly-oriented films that are most preferable. The uniaxially molecule-oriented films are formed of various types of thermoplastic resins such as polyethylenes, polypropylenes, polyester, polyamide, polycarbonate, polyvinylidene chloride, polyvinyl chloride, polystyrene, etc., or copolymers containing as the main component the aforesaid polymers, or mixtures of two or more of these thermoplastic resins. Preference is given to high-density polyethylene, medium-density polyethylene, low-pressure-processed linear low-density polyethylene and polypropylene films, and more preference is given to L-LDPE films and high-density polyethylene films having a density of 0.94 g/cm$^3$.

In the event that the uniaxially molecularly-oriented films are laminated on both sides of the cross-laminated fabric, the two films may be identical or different in the component. It is noted that the rates of molecular orientation and stretching as well as the thickness of the films may be identical or different.

The wording "uniaxially molecularly-oriented film" shall embrace a film in which the rate of orientation in the molecular orientation direction is higher than that in the direction perpendicular thereto by a factor of at least 1.5. For instance, an inflated film having a blow-up ratio of 2 and a ratio of longitudinal stretching of 3 may be referred to as the longitudinally threefold-stretched film.

Generally, the uniaxially molecularly-oriented films refer to (laterally or longitudinally) uniaxially stretched films (obtained by means of a tenter). In the present invention, however, that wording shall include physically shaped or inflated films (tubular films) that are molecularly oriented in an increased blow-up ratio as well as films that are strongly molecularly-oriented in the longitudinal direction, and then spirally cut for oblique molecular orientation (e.g., 45°). Known examples of the production of uniaxially molecularly-oriented (stretched) films are, for instance, disclosed in Japanese Patent Kokai Publication Nos. 47-34656 and 48-10046 corresponding to B. P. 1414681 and U.S. Pat. No. 3,891,374 as well as Japanese Patent Kokoku Publication Nos. 40-5319, 47-38621, 47-39927 and 53-18072.

Molecular orientation may be effected in any one of the longitudinal, lateral and oblique directions. However, it is advantageous that the molecular orientation axes of the two molecularly-oriented films laminated on both sides of the net layer are located at angles of 30° or more with each other.

Where it is intended to keep the tensile strength in every direction constant on the average, it is advantageous that the cross angles of the molecular orientation axes are maintained at 90°. For instance, longitudinally molecular orientation may be combined with laterally molecular orientation, or two films, molecularly-oriented obliquely at 45°, may be laminated to each other with their axes intersecting at right angles.

In the latter case, the porous cross-laminated fabric may be inserted into the tubular portion of a molecularly-oriented or stretched and extruded tubular film without cutting for direct lamination.

Where it is desired to enhance the tensile strength in a certain direction, the cross angles may advantageously be somewhere between 30° and 90°, rather than just 90°. However, since the tear strength parallel with the axes of molecular orientation or the tensile strength normal thereto drops at decreased cross angles, the cross angles are 30° or more, preferably in a range of 45° to 90° for the purpose of general packaging materials.

No particular limitation is imposed upon the extent of molecular orientation and stretching, which may be selected depending upon the resin components used and the use of the products. However, a noticeable stretching effect is achieved, where the stretching ratio is in a range of 2 to 15. In the case where a light-shielding substance is contained, it is preferred that the stretching ratio is in a range of 2 to 7 in view of the quality of films as by expressed in terms of the occurrence of fisheyes.

The thickness of the films may be selected depending upon the purpose, but may generally be in a range of 15 to 120 microns for the purpose of packaging materials.

The thickness of the at least three-layer laminate wherein flexible sheet layers are laminated on both sides of the porous cross-laminated fabric is 0.05 to 2.0 mm, preferably 0.10 to 0.60 mm in view of price, toughness, suitability with respect to processing machines (e.g., heat-sealing properties, curling properties, bag-making properties, easy-to-fold-properties, easy-to-cut-properties, etc.), physical strength, productivity, etc.

In the following, the low-pressure-processed linear low-density polyethylene (hereinafter abbreviated as L-LDPE) film will be explained in detail. Japanese Patent Kokai Publication No. 58-132555 describes the outcome of intensive studies made by the present inventor as the method for eliminating the disadvantage that, when a light-shielding substance is added to the prior art high-pressure-processed low-density polyethylene (hereinafter abbreviated as LDPE) or low-pressure-processed high-density polyethylene (hereinafter abbreviated as HDPE film), there is a drop of the physical strength. That is, that film is a film consisting of a polyethylenic polymer and a light-shielding substance in an amount of 1% by weight or more, wherein 50% by weight of the overall polyethylenic polymer is a low-pressure-processed linear low-density polyethylene (L-LDPE).

In the present invention, use is preferably made of a light-shielding film which contains 1% by weight or more of a light-shielding substance, and in which 50% by weight or more of the overall polyethylenic polymer is L-LDPE.

Preferably, the remaining portion of said polyethylenic polymer, except for L-LDPE, is substantially a high-pressure-processed low-density polyethylene (LDPE). However, that remaining portion may partly contain other polyethylenic polymers such as ethylene-vinyl acetate copolymers (EVA), ethylene-ethyl acrylate copolymers (EEA), etc., as long as no modification is made to the basic characteristics.

The L-LDPE film is called the third polyethylene film which has the advantages of low, medium- or high-pressure-processed polyethylene, and provides a low-cost and high-strength film to meet current demand for energy and savings in resources. Referring to the composition, that film is a copolymer obtained by the copolymerization of ethylene and an alpha-olefin having 3 to 13, preferably 4 to 10 carbon atoms in the low-pressure process, and is low- or medium-density polyethylenic polymer of the structure wherein the linear straight chain has a short branch.

More concretely, L-LDPE used in the present invention is commercially available under the trade names of UNIPOL (Union Carbide), DOWLEX (Dow Chemical), MARLEX (Philips), SCLAIR (Du Pont, Canada), ULTZEX and NEOZEX (Mitsui Petrochemical Ind.), NISSEKI LINIREX (Nippon Petrochemicals Corp.), STAMYLEX (DSM), and such. The alpha-olefins embrace butene-1, octene-1, hexene-1, 4-methylpentene-1, etc., which are used in an amount of about 0.5 to 10 mole % of the polymer. Generally, L-LDPE is supposed to have a density equal to that of the low- and medium-pressure-processed polyethylene; however, commercially available products have a density in a range of 0.91 to 0.95 g/cm$^3$ in most cases.

L-LDPE is superior to LDPE in strength, but it has poor transparency and involves difficulty in processing. For that reason, L-LDPE has been considered to be unsuitable for the production of packaging films.

The present inventors investigated the influence of the incorporation of carbon black in L-LDPE that was problematic if employed for packaging films. In consequence, it was found that, where carbon black was incorporated into L-LDPE, the unexpected results that the physical strength increased considerably were obtained, contrary to the case of high-pressure-processed low-density polyethylene (hereinafter called LDPE).

Compared with L-LDPE, LDPE originally has a lower strength, and a drop of strength becomes very marked, especially when carbon black is added. On the contrary, with L-LDPE there is a marked improvement in strength by the addition of carbon black.

The effect of carbon black to be added begins to become noticeable in an amount of 1% by weight, and become more marked in an amount exceeding 3% by weight. However, too great an increase in that amount gives rise to an increase in the number of fisheyes, and results in a rise in the cost. In particular, when the amount of carbon black exceeds 30%, the number of fisheyes increases due to unsatisfactory dispersion of carbon black, and there is a problem that the occurrence of pinholes deteriorates the light-shielding properties. In addition, there is a rise in the cost.

It is desired, therefore, that the amount of carbon black to be added is 1 to 30% in view of economization, occurrence of fisheyes, tear strength, etc. That amount is more preferably 3 to 10%. This holds for other light-shielding substances.

In particular, the present invention will now be explained with reference to the masterbatching method, to which the invention is not exclusively limited, and in which carbon black is incorporated into the polyethylenic polymer.

First of all, carbon black is mixed with LDPE (high-pressure-processed low-density polyethylene) in a high concentration of 2% by weight or higher, generally 10% by weight or higher, to form a masterbatch. The masterbatch is weighed in such a way that the carbon black content of the final product reaches the given value, and is mixed with L-LDPE.

In this method there are two merits. One is that mixing and dispesion are more easily effected, as compared with direct mixing of carbon black with L-LDPE, leading to cutdown in the cost and the prevention of the occurrence of fisheyes.

Another is that the combination system of LDPE and L-LDPE is superior to the single system of L-LDPE in the processability in the film preparation. As the masterbatching resin, L-LDPE may be used to cut down the mixing cost of carbon black. In the present invention, the masterbatching resin is preferably a polyolefinic resin having a melt index higher than that of L-LDPE in view of uniform mixing. It is to be noted that this holds substantially for the use of other light-shielding substances.

With L-LDPE, the melt tension and flowability posed grave problems in that the preparation of films therefrom not only required larger energy than did the production of films from polyethylene, and design modification or even new installation of an inflation molding machine was also supposed to be needed.

In this connection, for instance, Japanese Patent Kokai Publication No. 55-117638 discloses a method for modifying the structure of a screw, which is adapted to reduce the amount of load impressed thereon and heat generated by the revolution.

Where 5% or higher of LDPE is contained in the L-LDPE polyethylenic polymer, a conventional T-die or inflation molding machine can be used without making any modification thereto, according to the masterbatching method of the present invention.

From the standpoint of processability alone, the less the amount of L-LDPE, the better the results will be. However, where the amount of LDPE is above that of L-LDPE in the present invention, carbon black produces no sufficient effect upon increases in strength. It is thus required that the amount of L-LDPE contained in the overall polyethylene polymer be preferably 50% or higher, more preferably 60% or higher. Although improvements in processability are achieved even by mere incorporation of LDPE into L-LDPE, the addition of the light-shielding substance makes a contribution to further increases in the bubble stability in combination with its own favorable influence.

On the other hand, the polymer blend system excels in physical properties, and is markedly improved in respect of tear strength, heat-seal strength and Gelbo test strength in particular.

Typical adhesives include polyolefinic thermoplastic hot-melt adhesives such as polyethylenes, polypropylene, polybutene, etc., thermoplastic resin hot-melt adhesives such as olefin copolymers, for instance, ethylene-propylene copolymers, ethylene-vinyl acetate copolymers, ethylene-ethyl acrylate copolymers, etc., ionomer resins, etc., and other hot-melt type rubber base adhesives. Liquid adhesives include adhesives for wet lamination, which are in the form of an emulsion or latex. Typical of the emulsion type adhesives are emulsions of polyvinyl acetate, vinyl acetate-ethylene copolymers, copolymers of vinyl acetate and acrylate, copolymers of vinyl acetate and maleate, acrylic copolymers, ethylene-acrylic acid copolymers, etc. Typical of the latex type adhesives are rubber lattices such as natural rubber, styrene butadiene (SBR), acrylonitrile butadiene (NBR), chloroprene (CR), etc. Dry laminate adhesives such as polyurethane adhesives may be used. In addition, use may be made of known adhesives such as hot-melt laminate adhesives, pressure-sensitive adhesives, heat-sensitive adhesives, etc., which are obtained by the blending of paraffin wax, microcrystalline wax, ethylene-vinyl acetate copolymers, ethylene-ethyl acrylate copolymers, etc. More concretely, the polyolefinic adhesives for extrusion include polymers and copolymers of polyolefins such as polyethylenes, polypropylene, polybutylene, EPR, etc., copolymers of ethylene and other monomers such as low-pressure-processed linear low-density polyethylene (L-LDPE), ionomer resins (ionic copolymers) such as surlyn (trade name) by Du Pont, Himiran (trade name) by Mitsui Polychemical Corp., etc., and graft polymers.

It is desired that these adhesives have a melting point lower by at least 5° C. than those of the flexible sheets to be laminated upon each other. Given such a temperature difference, complete hot-melt bonding can be achieved without producing any adverse influence upon the flexible sheets.

In particular, when any one layer of the flexible sheet layers to be laminated upon both sides of the porous cross-laminated fabric or when that fabric is molecularly-oriented (stretched), use is preferably made of an adhesive layer which consists of a thermoplastic resin and is bondable at a temperature that does not damage the properties of the molecularly-oriented film or the porous cross-laminated fabric (in the event that said film is formed of HDPE, a resin-melting temperature is about 250° to 350° C.), such as, for instance, high-pressure-processed low-density polyethylene (LDPE), ethylene-vinyl acetate copolymer (EVA), ethylene-ethyl acrylate copolymers (EEA), ionomer resins, linear low-density polyethylene (L-LDPE) that is a low-pressure-processed low-density polyethylene, etc.

The thickness of the adhesive layer is usually 0.01 to 0.5 mm, preferably 0.015 to 0.2 mm, and is determined on the basis of the cost, the application rate and the total thickness of the laminate; however, the present invention is not limited to those values.

The adhesives are applied on the surface of one flexible sheet of the cross-laminated fabric, but are not applied on the other sheet. With this arrangement, the adhesives penetrate through the apertures in that fabric, and reach the opposite surface at which they are bonded to the other flexible sheet. However, at the fibrous portion of the cross-laminated sheet, it is not bonded to the flexible sheet, leaving the unbonded portion. In this manner, it is required that the cross-laminated fabric is bonded to the flexible sheets, whereby the tear strength of the laminate is increased, thus making it hard to tear. When the adhesive layer is formed entirely over both sides of the cross-laminated fabric, the resulting laminate is united to an integral member, thus losing the effect as mentioned above. However, in order to maintain the integrity of the laminate to some extent, it is required that the two flexible sheet layers be bonded to the cross-laminated fabric over an area of at least 10%, preferably at least 50%. The application of the adhesive layer on one side simplifies the lamination steps; namely, one step is omitted. In addition, the amount of the adhesives used is also decreased. Thus, the present invention provides a packaging material which is inexpensive and more resistant to tearing, impact perforation, failure, etc. It is generally advantageous that the adhesive layer is applied on the inner layer, rather than the outer layer, of the one flexible sheet, said inner layer being in contact with a photosensitive material. This is because it is possible to prevent static mark, abrasion mark, stress mark, wear and transfer of convex patterns from occurring on the photosensitive material, which may otherwise be caused by said convex patterns.

The adhesive layer is applied in a thickness of 0.007 to 1.0 mm. Preferably, it is applied in a thickness of at least 20% of the mean thickness of the porous cross-laminated fabric, whereby the flexible sheet applied with the adhesive layer and the opposite flexible sheet applied therewith through the apertures (meshes) are bonded partly, not entirely, over the cross-laminated fabric.

For partial bonding, lamination is carried out with the adhesive layer having a thickness of at most 80% of the thickness of the cross-laminated fabric (the thickness of fibers). More preferably, lamination is carried out with the adhesive layer having a thickness of at most a half of that of the cross-laminated fabric.

When the flexible sheet layers on both sides of the porous cross-laminated fabric are formed of a thermoplastic resin film, synthetic paper or bonded fabric, similar effects are obtained even by partial bonding, which relies upon heat-sealing bonding methods using a heating roller, a heating plate, a heating gear or the like, or known welding methods such as ultrasonic welding, high-frequency welding, etc., without the application of any adhesive layer of sufficient thickness.

The packaging materials of the present invention are used for the packaging of various articles, but are especially useful for the packaging of photographic photosensitive materials. It is required to this end that at least one layer of the overall laminate have light-shielding properties. For that purpose, 0.1 to 30% by weight of a light-shielding substance may be incorporated into one or more of the flexible sheet layers, the adhesive layer or other layers. Alternatively, another layer having light-shielding properties such as colored paper, a metal foil having a thickness of 5 to 50 microns such as an aluminum foil, a zinc-plated thin-layer steel plate, etc., paper with a metal-deposited layer of 100–1200 Å (angstroms) (e.g., aluminum-deposited paper), a metal-deposited film (e.g., an aluminum-deposited film), etc., may be laminated on said one or more of layers. Still alternatively, the light-shielding properties may be afforded by printing.

The suitable amount of the light-shielding substance, if present, is in a range of 0.5 to 36 g per unit area (m$^2$) of the overall laminate. The addition of the light-shielding material to the stretched film in an amount of 12% by weight or higher is unpreferred, since the occurrence of fisheyes generally leads to drops of physical strength, etc. A preferable amount of the light-shielding substance is therefore in a range of 0.1 to 7% by weight, provided that this is not true of the flexible sheets such as non-stretched films, paper or the like. In this case, the light-shielding substance can be in an amount of up to 30% by weight or up to 36 g per unit area (m$^2$). The light-shielding substance shall embrace any substance which does not transmit visible and untraviolet light therethrough, and typically includes various carbon black, aluminum powders, aluminum paste, coloring pigments, coloring dyes, white pigments such as titanium oxide, barium sulfate, calcium carbonate and clay, various powdery metals, various fibrous metals and such. In respect of quality, cost and light-shielding power, carbon black, aluminum powders, and aluminum paste freed of low-volatile ingredients are preferred for the purpose of packaging photosensitive materials.

The carbon black, to which particular preference is given, has pH value of 5 to 9 and a mean particle size of 10 to 50 millimicrons in view of improvements in the light-shielding properties and limited decreases in the properties. The most preference is given to furnace carbon black having a pH value of 6 to 9 and a mean particle size of 15 to 30 millimicrons.

In order to improve the light-shielding properties to the possible highest degree with the same amount of the light-shielding substance, it is preferably added to the inner side (the side to be in contact with the article packaged therein or the side to be heat-sealed in the case of a bag).

The key three layers indispensable to the present invention, i.e., the two flexible sheet layers and the porous cross-laminated fabric, are as described in the foregoing. However, other layer may be additionally laminated to the key three layers in carrying out the present invention.

For instance, the lamination of a heat-resistant and flexible sheet such as that formed of various types of paper, bonded fabric, cellophane, etc. are taken as introducing improvements into heat sealability, strength, slip properties, antistatic properties, printability, light-shielding properties, appearance, etc.

In particular, if an outermost layer applied to one flexible sheet is formed of a layer that is not meltable by heat or a layer that has a melting point higher by at least 5° C. than that of the innermost layer (to be heat-sealed), it is then easier to heat-seal together the low-melting point sides, thus making the production of bags having improved heat sealability advantageous.

More concretely, heat-sealing is more easily carried out, if the outermost layer is formed of any one of paper, aluminum-deposited paper, an aluminum-deposited thermoplastic resin film, cellophane, bonded fabric, cloth and a metal foil, each having a thickness of 10 microns or lower.

In particular, if the outermost layer is formed of paper having a thickness of 30 to 110 microns, both the light-shielding properties and heat resistance are then satisfied. It is highly advantageous that this layer is laminated on a molecularly-oriented film (flexible sheet).

The same effect is obtained, if the innermost layer (to be heat-sealed) is provided with, e.g., an easily heat-sealable layer having a melting point lower by at least 5° C. than that of the opposite, outermost molecularly-oriented film. The formation of the easily heat-sealable layer may rely upon coating or lamination. For instance, when the outermost layer is formed of a stretched film of polyester or nylon, heat-sealing is easily carried out, if the innermost layer (to be heat-sealed) is formed of a low-density polyethylene film. The addition of 0.1 to 30% by weight of a light-shielding substance to this layer is especially useful for packaging photosensitive material. Where the light-shielding substance is incorporated into one layer along, it is rather advantageous to add that substance to the innermost layer for the purpose of preventing it from leaking through the heat-sealed portion and assuring the light-shielding properties.

The synthetic resins that are easily heat-sealable include thermoplastic resins such as polyethylenes, polypropylene, nylon, polyester, ethylene-vinyl acetate copolymers, ethylene-ethyl acrylate copolymers, polyvinyl vinylidene, or blended resins of two or more thereof. Among others, low-pressure-processed linear low-density polyethylene (L-LDPE) is advantageous in that it provides improved strength, when a light-shielding substance is added thereto. The laminates obtained by the cross-lamination of this with other uniaxially or biaxially molecularly-oriented films are useful.

Referring to one example of the layer structure wherein heat-sealing is easily carried out in the case that the flexible sheets to be laminated on both sides of the porous cross-laminated fabric are formed of uniaxially molecularly-oriented thermoplastic resin films, it is advantageous that the surface layer (inner layer) of one flexible sheet is laminated with an easily heat-sealable layer having a melting point lower by at least 5° C., preferably 10° C., than that of the uniaxially molecularly-oriented film, for instance, a low-pressure-processed linear low-density polyethylene layer containing 0.5 to 30% by weight of a light-shielding substance. The heat-sealing layer used is formed of thermoplastic resin films such as those of polyethylenes, polypropylene, nylon, polyester, ethylene-vinyl acetate copolymers (EVA), ethylene-ethyl acrylate copolymers (EEA), polyvinyl chloride (PVC), polyvinylidene chloride (PVCD), etc. For instance, these films are 10 to 80 microns in thickness in the case of extrusion coats and 30 to 120 microns in thickness in the case of inflation films for lamination. Particular preference is given to high-pressure-processed low-density polyethylene, ethylene-vinyl acetate copolymers, ionomers, linear low-density polyethylene (L-LDPE), ethylene-ethyl acrylate copolymers (EEA), etc.

For packaging a photosensitive article, the slip properties of the layer to be in contact with that article are expressed in terms of a coefficient of static friction of 0.466 or lower (a slip angle of 25° or lower), preferably 0.325 or lower (a slip angle of 18° or lower). Such properties are attained by the addition of lubricants or matting the surface. Alternatively, the aforesaid slip properties are satisfied by the selection of the material of a film constituting the heat-sealed surface (the film surface to be in contact with an article).

When the slip angle of the flexible sheet to be in contact with a photographic photosensitive material exceeds 25°, that sheet layer wears away on the surface at the time of friction, so that black powders are deposited onto the article, thus giving rise to spot failures.

It is preferred from these considerations that the flexible sheet layer (the heat-sealed layer) to be in contact with a photographic photosensitive material is formed of a lubricant-containing film consisting of thermoplastic resin, or low-pressure-processed linear low-density polyethylene resin (L-LDPE), or medium- or high-density polyethylene resin. Even when the laminates of the same layer structure as in the present invention are prepared with films having a slip angle of more than 25° and consisting of conventional EVA resin, EEA resin and high-pressure-process low-density polyethylene resin, etc., each being free from any lubricant, they are unpreferred as the packaging materials for photographic photosensitive materials in view of processability, slip properties and physical strength.

The laminated films of the foregoing structure, which are prepared as mentioned above, show a small degree of curling. Furthermore, since they excel in tear strength, impact perforation strength, article insertability, Gelbo test strength and drop strength, they are useful as the packaging materials. In particular, where the light-shielding properties are afforded to them, they are useful for packaging photographic photosensitive materials.

For instance, the preferred embodiments of the present invention are as follows. More specifically, the preferred packaging materials for photosensitive materials are constructed form laminates which are formed of porous cross-laminated fabric having one side laminated through a polyolefinic (embracing polyethylene copolymers such as LDPE, EEA, L-LDPE, PP, EVA, ionomers, etc.) adhesive layer with a uniaxially stretched, preferably uniaxially and obliquely stretched or molecularly-oriented, HDPE film (embracing a longitudinally and uniaxially stretched film that is also spirally slit), and stretched film having a ratio of stretching of 2.0 to 7.0, a thickness of 15 to 70 microns and a density of at least 0.94 g/cm$^3$, and containing 0.5 to 7% by weight of carbon black, and having the other side laminated through said polyolefinic adhesive layer penetrating through the apertures or meshes therein with a uniaxially stretched film, preferably a uniaxially stretched HDPE film (embracing a longitudinally and uniaxially stretched film that is also spirally slit) in such a manner that its stretching axis intersects at a cross angle of at least 30° with that of said uniaxially stretched film, both said uniaxially stretched films showing a thickness difference of within 15%, and at least one of said layers containing 0.5 to 36 g/m$^2$ of carbon black. Such packaging materials are best-suited for photographic photosensitive materials, and are significantly improved in respect of the price, physical strength, flexibility and resistance to curling.

In the following, the preferred embodiments of the present invention will not be explained with reference to the accompanying drawings.

Figure 1:
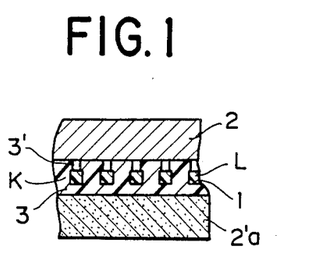
FIGS. 1 to 5 are partly sectional views showing the laminates according to the present invention.
Figure 2:
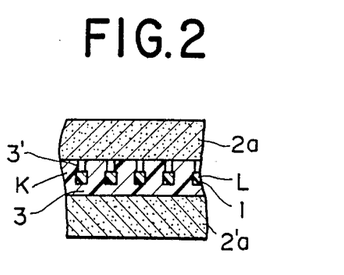
Figure 3:
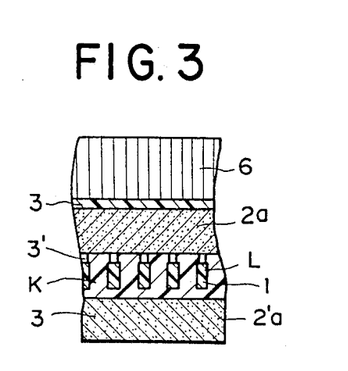
Figure 4:
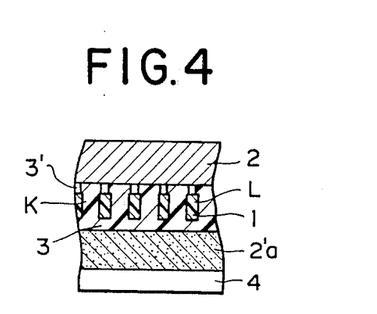
Figure 5:
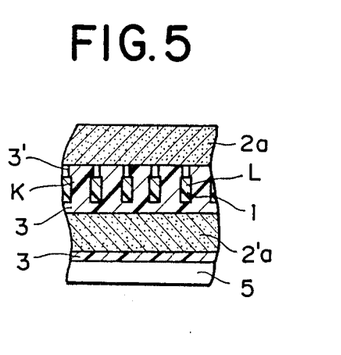
Figure 6:
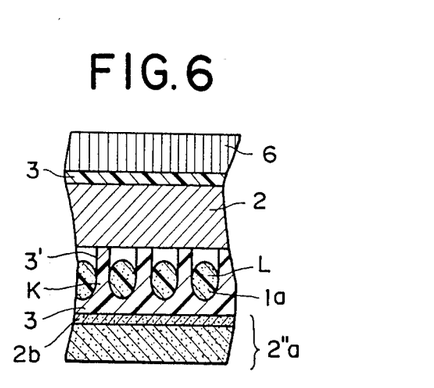
FIG. 6 is a partly sectional view showing an application example of the present invention.

FIGS. 1 and 2 show the basic structure of the laminates which are the packaging materials according to the present invention. Flexible sheet layers 2 and 2'a (FIG. 1), or 2a and 2'a (FIG. 2, containing a light-shielding substance) are laminated on both sides of porous cross-laminated fabric 1 through an adhesive layer 3. The adhesive layer 3 penetrates through the meshes K in the cross-laminated fabric 1, and forms an adhesive layer 3'. In FIG. 3, a layer 6 of a flexible sheet more heat-resistant than 2'a is further added to the surface of the basic structure of FIG. 2 through a further adhesive layer 3. FIGS. 4 and 5 show heat-sealing layers 4 and 5, respectively laminated on the surface of the flexible sheet 2 or 2a, 2'a without (or with) an adhesive layer. FIG. 4 illustrates an example wherein a light-shielding substance is incorporated into only one of the flexible sheet 2'a. The adhesive layer 3 is a hot-melt adhesive layer or other adhesive layer. In FIG. 6, an adhesive layer 3 is provided on a flexible sheet 2"a obtained by providing an aluminum-deposited layer 2b on the layer 2a' as in FIG. 3. A flexible sheet 2 is laminated on porous cross-laminated fabric (1a) containing a light-shielding substance through an adhesive layer 3' formed through the meshes K therein, and a layer 6 of a flexible sheet more heat-resistant than 2'a is further added through a further adhesive layer 3.

FIGS. 7 to 16 shows typical examples of the bonded fabrics (cross-laminated fabrics) of the single and double mesh structure.

Figure 7:
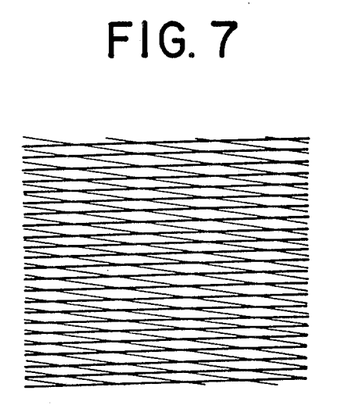
FIGS. 7 to 18 are typical plan views showing the thermoplastic resin bonded fabrics of the mesh structure (the porous cross-laminated fabrics).

FIG. 7 shows a porous cross-laminated fabric of the single mesh structure comprising warps and wefts having a different thickness.

Figure 8:
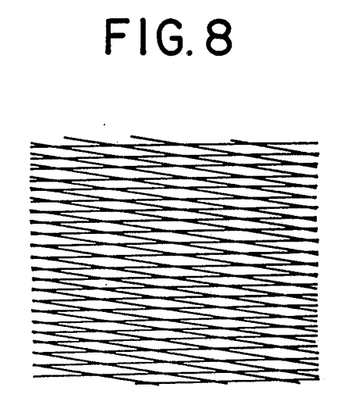

FIG. 8 shows a porous cross-laminated fabric of the single mesh structure comprising warps and wefts having a substantially equal thickness.

Figure 9:
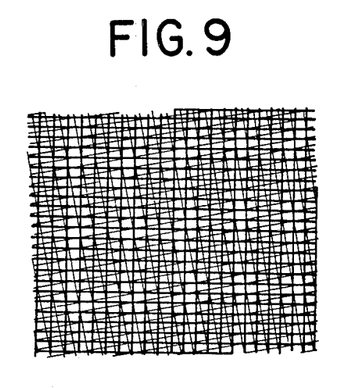

FIG. 9 shows a porous cross-laminated fabric of the double mesh structure comprising warps and wefts having a substantially equal thickness.

Figure 10:
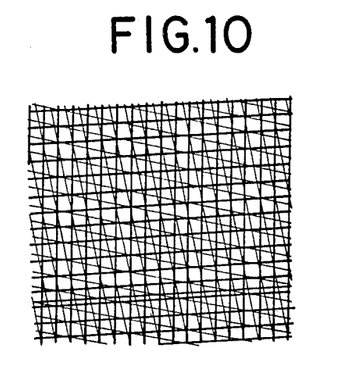

FIG. 10 shows a porous cross-laminated fabric of the double mesh structure comprising warps and wefts having a substantially equal thickness, with the aperture ratio being higher than that of FIG. 9.

Figure 11:
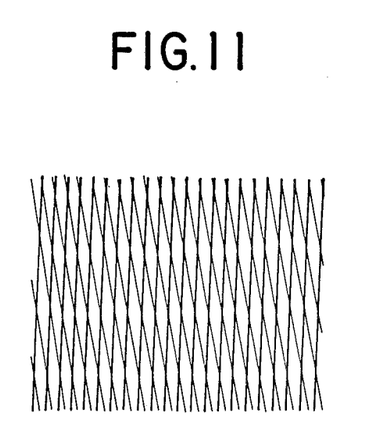
Figure 12:
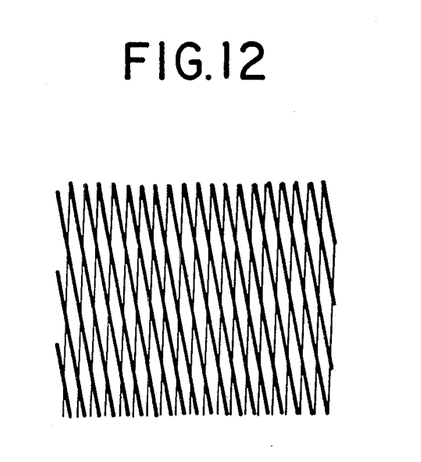

The cross-laminated fabrics of FIGS. 11 and 12 are substantially the same as those of FIGS. 7 and 8, except that they are of the longitudinal mesh structure with a higher aperture ratio.

Figure 13:
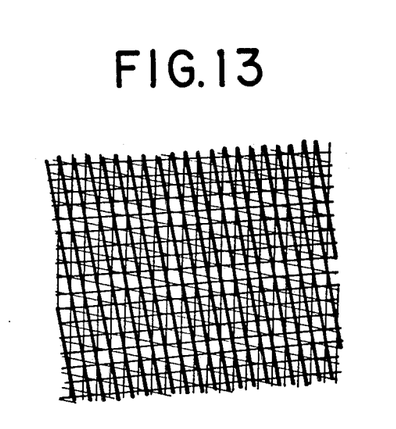

FIG. 13 shows a porous cross-laminated fabric of the double mesh structure in which a porous cross-laminated fabric having a substantially equal thickness is laminated to a porous cross-laminated fabric comprising the combination of warps having a thickness substantially similar to those of the first-mentioned fabric with wefts having a smaller thickness.

Figure 14:
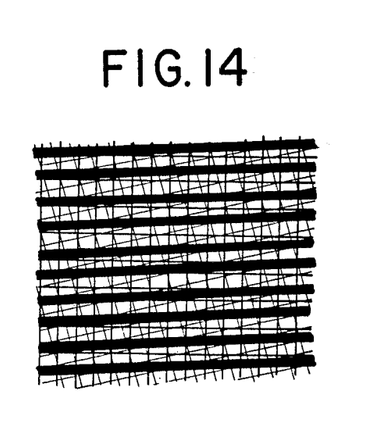

FIG. 14 shows a porous cross-laminated fabric of the double mesh structure in which a porous cross-laminated fabric having wefts different in thickness is laminated to a porous cross-laminated fabric comprising warps and wefts having a substantially equal small thickness.

Figure 15:
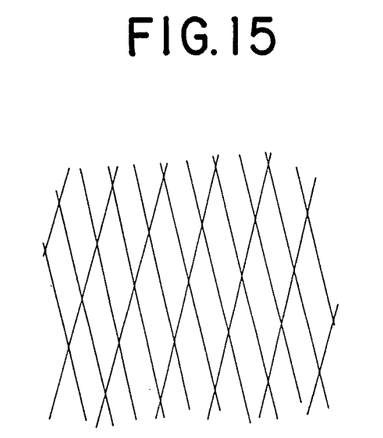

FIG. 15 shows a porous cross-laminated fabric with a relatively high aperture ratio.

Figure 16:
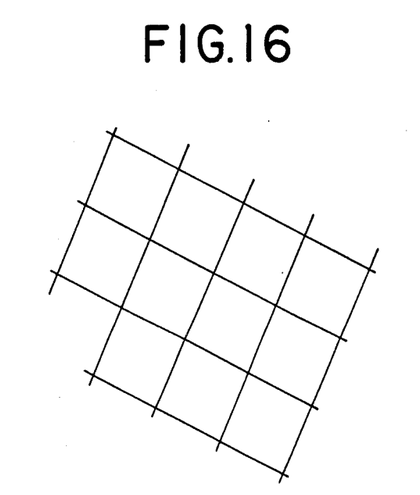

FIG. 16 shows a porous cross-laminated fabric of the structure comprising thicker warps and wefts, which has the highest aperture ratio allowable in view of productivity, strength, lamination ability, etc.

Figure 17:
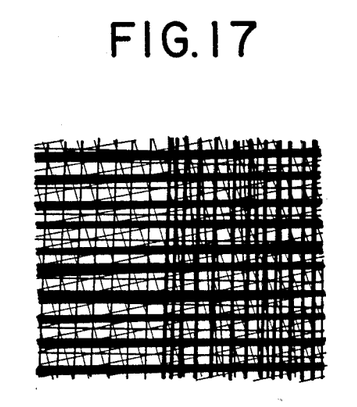

FIG. 17 illustrates the junction of the cross-laminated fabric of FIG. 14 used to form a long sheet (right half). Four cross-laminated fabrics of the mesh structure are superposed one upon another to reduce the aperture ratio to a very small value. Hence, when the junction is large, interlaminar separation may possibly take place, since the adhesive layer does not reach the other side of the cross-laminated fabric combination within a short time (of up to 0.5 seconds).

The aperture ratio of the junction portion is 16% that is close to the lower limit.

Figure 18:
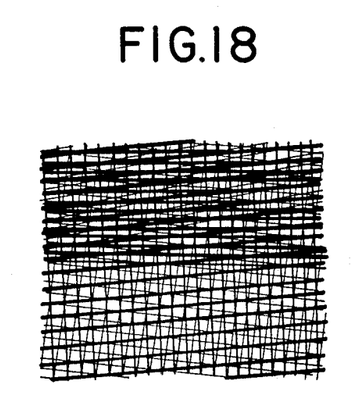

FIG. 18 shows the junction of the cross-laminated fabric of FIG. 10 (upper half). The same as mentioned in connection with FIG. 17 holds.

In the following, the standard physical properties of WARIFU manufactured by Nippon Petrochemicals Corp., which is now commercially available, will be given.

| Properties Measured | Unit | NISSEKI WARIFU EX | | NISSEKI WARIFU HS | | NISSEKI WARIFU S | | NISSEKI WARIFU SS | |
|---|---|---|---|---|---|---|---|---|---|
| | | Longitudinal | Transverse | Longitudinal | Transverse | Longitudinal | Transverse | Longitudinal | Transverse |
| Basis Weight | g/m$^2$ | 48–50 | | 33–35 | | 22–24 | | 18–19 | |
| Tensile Strength | kg/5 cm | 30 | 30 | 23 | 23 | 15 | 15 | 11 | 11 |
| Tensile | % | 28 | 28 | 24 | 24 | 22 | 22 | 20 | 20 |

-continued

| Properties Measured | Unit | NISSEKI WARIFU EX | | NISSEKI WARIFU HS | | NISSEKI WARIFU S | | NISSEKI WARIFU SS | |
|---|---|---|---|---|---|---|---|---|---|
| | | Longitudinal | Transverse | Longitudinal | Transverse | Longitudinal | Transverse | Longitudinal | Transverse |
| Elongation | | | | | | | | | |
| Tear Strength | kg | 1.2 | 1.2 | 0.8 | 0.8 | 0.5 | 0.5 | 0.3 | 0.3 |
| Thickness | mm | 0.17 | | 0.10 | | 0.08 | | 0.07 | |

Testing Methods:
Tensile Strength Elongation JISL 1068-1064
Tear Strength JISL 1079-1966 A1 Process (Single-Tong Process)

Figure 19:
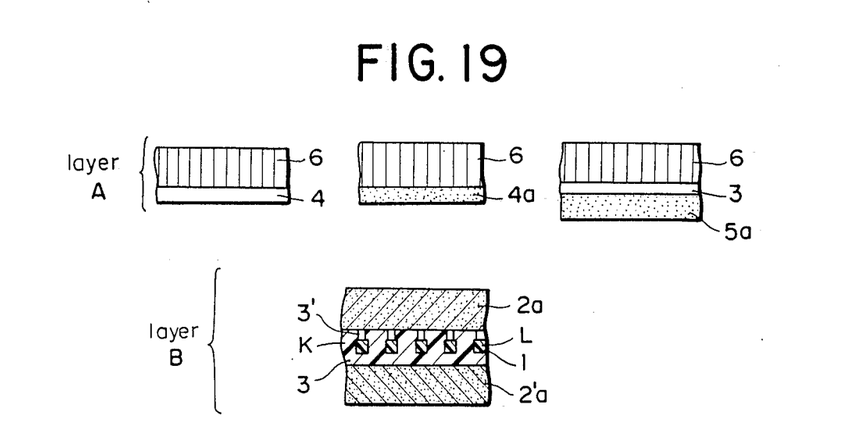
FIG. 19 shows a typical example of the layer structure of a double bag, in which a layer A is used as the outer layer, and a layer B is located on the side to come in contact with a photosensitive material. It is particularly preferred that the laminate of the present invention is used as the layer B.

FIG. 19 illustrates a typical example of the layer structure of a double bag, in which a layer A is used as the outer layer, and a layer B is adapted to be in contact with a photographic photosensitive material. It is particularly preferred that the laminate of the present invention is used as the layer B.

Figure 21:
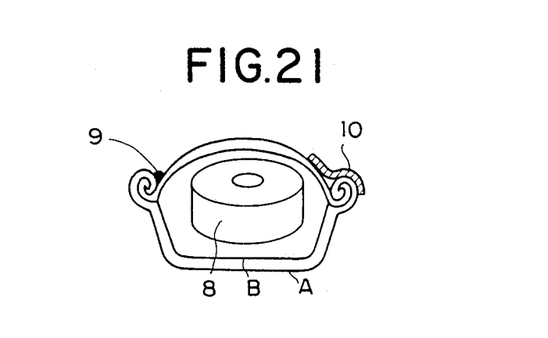
FIG. 21 is schematically sectional view showing the packaged forms of monochromic or color rolled photosensitive materials.

In this case, the layers A and B may temporarily be bonded at their peripheral edges by dotted sealing, or be bonded linearly at their peripheral edges. Alternatively, they may be bonded partly or entirely over their surfaces at the time of bag-making. As illustrated in FIG. 21, in some cases, the layer A may be used as the outer packaging material for a double bag. In this case, the layers A and B have a strength higher than that of the laminate obtained by bonding, and are suitable for packaging articles of large or medium weight and size.

Figure 20:
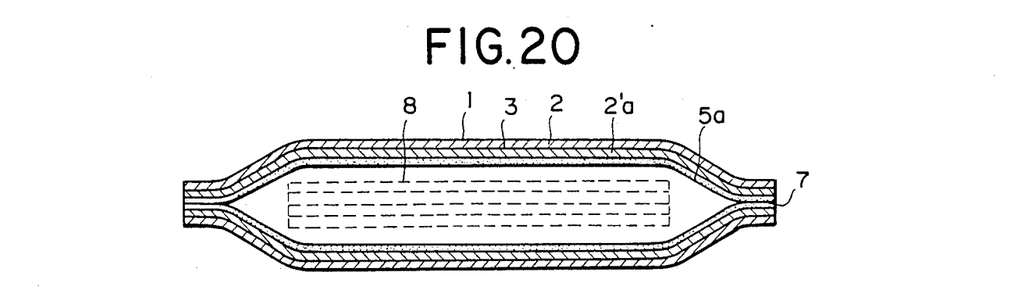
FIG. 20 is a sectional view showing a completely sealed and packaged photographic photosensitive material.

FIG. 20 is a sectional view of a completely seal-packaged photographic photosensitive material, and FIG. 21 shows schematic sections of the packaged forms of rolled-up monochromic or color photosensitive materials (photographic paper, cinefilms, microfilms, phototypographic paper, PS prints, diazo, printing films, heat-sensitive paper, photosensitive resins, indirect X-ray films).

EXAMPLES

Reference will now be made to the preferred examples of the present invention and the effect thereof.

Six samples according to the present invention were compared with three samples according to the prior art wherein an aluminum foil was used.

The inventive samples were further compared with a laminate sample of the same structure as in the present invention, provided that comparison was made when a contact time of the thermoplastic resin adhesive layer and the a porous cross-laminated film exceeded 0.6 seconds.

Inventive sample 1 was a laminate of the layer structure of FIG. 1 in which carbon black was added to 2′a alone. NISSEKI WARIFU illustrated in FIG. 13 and manufactured by Nippon Petrochemicals Corp. was used as the cross-laminated fabric. The adhesive layer 3 used was formed of a low-density polyethylene having a thickness of 20 microns and a resin temperature of 310° C., and was coated on the flexible sheet 2′a by means of the T-die process in such a manner that a time by which it contacted a cooling roll was 0.1 second. The sheet 2′a is a film prepared by the inflation process, in which 4.5% by weight of carbon black were added to a low-pressure-processed linear low-density polyethylene having a thickness of 70 microns (linear low-density polyethylene abbreviated as L-LDPE available under the trade name of ULTZEX No. 2020L manufactured by Mitsui Petrochemical Ind.). The opposite flexible sheet 2 (a biaxially stretched polyethylene terephthalate film having a thickness of 20 microns) was laminated on the net layer 1 through an adhesive layer 3′ formed through the meshes K therein.

Inventive sample 2 was a laminate of the layer structure of FIG. 2, in which NISSEKI WARIFU manufactured by Nippon Petrochemicals Corp. and illustrated in FIG. 10 was used as porous cross-laminated fabric 1.

The adhesive layer 3 used was formed of a low-density polyethylene having a thickness of 15 microns and a resin temperature of 310° C. (abbreviated at LDPE), and was applied on a flexible sheet 2′a (a mixed film prepared from a mixture of 85.5% by weight of L-LDPE having a thickness of 50 microns with 10% by weight of LDPE and 4.5% by weight of carbon black by the inflation process) by means of the T-die process in such a manner that a time by which it contacted a cooling roll was 0.1 second. The opposite flexible sheet 2a (the same film as 2′a) was laminated on the fabric 1 through an adhesive layer 3′ formed through the meshes K therein.

Inventive sample 3 was of the same layer structure as Inventive sample 2, and was prepared under the same recipes and production conditions as therein. However, the lamination rate was decreased in such a manner that time from the application of a thermoplastic resin adhesive layer 3 to the contact thereof to a cooling roll was 0.15 seconds.

Inventive sample 4 was of the layer structure as invented sample 2; however, the porous cross-laminated fabric 1 used was NISSEKI WARIFU illustrated in FIG. 9 and manufactured by Nippon Petrochemicals Corp.

Inventive sample 5 was a laminate of the same layer structure as Inventive sample 2; however, the flexible sheet 2a used was formed from a laterally and uniaxially stretched high-density polyethylene film having a thickness of 50 microns, a carbon black content of 4.5% by weight and a density of 0.96 g/cm³.

Inventive sample 6 was a laminate of the layer structure of FIG. 2, in which the porous cross-laminated fabric 1 was NISSEKI WARIFU illustrated in FIG. 10 and manufactured by Nippon Petrochemicals Corp.

An adhesive layer 3 (a low-density polyethylene (LDPE) having a thickness of 20 microns and a resin temperature of 320° C.) was formed on only a flexible sheet 2′a to be in contact with a photographic photosensitive material by means of the T-die process in such a manner that a time which it contacted a cooling roll was 0.1 second. Both the flexible sheets 2′a and 2a were formed of an obliquely and uniaxially molecularly-oriented high-density polyethylene film (BKM) having a carbon black content of 4.5% by weight, a density of 0.96 g/cm³ and a thickness of 40 microns. These two layers were laminated on a net layer in such a manner that their axes of molecular orientation intersected at 90°.

Inventive sample 7 was of the layer structure of FIG. 6, in which the porous cross-laminated fabric 1 used was NISSEKI WARIFU illustrated in FIG. 10 and manufactured by Nippon Petrochemicals Corp.

The adhesive layer 3 used an ethylene-ethyl acrylate copolymer having a thickness of 20 microns and resin temperature of 310° C. (abbreviated as EEA avaiable under the trade name of EEA 617 manufactured by Nippon Unicar), and was applied on a flexible sheet 2"a (a 400-A thick aluminum vacuum deposited-film comprising a 35-micron thick, obliquely and uniaxially molecularly-oriented film prepared by adding 4.5% by weight of carbon black to a high-density polyethylene having a density of 0.96 g/cm$^3$) in such a manner that a time by which it contacted a cooling roll was 0.1 second. The opposite flexible sheet 2a (an obliquely and uniaxially molecularly-oriented high-density polyethylene having a carbon black content of 4.5% by weight, a thickness of 35 microns and a density of 0.96 g/cm$^3$) was laminated on the fabric 1 through an adhesive 3' formed through the meshes K therein in such a manner that the axes of molecular orientation 2"a and 2a intersected each other.

EFFECT OF THE INVENTION

Table 1 shows the layer structures of the packaging materials for photographic photosensitive materials, and Table 2 indicates the properties thereof.

As a result, it has been found that the inventive samples do not only excel in tear strength, impact perforation strength, heat-sealing strength, resistance to curling, Gelbo test strength and drop strength, but are also improved in respect of tensile strength and bending strength.

In the case of the sample of the same structure except for the adhesive layer, on the contrary, when the adhesive layer 3 has a resin temperature exceeding 350° C., and a time for which that layer is extruded on one flexible sheet and is laminated to the opposite flexible sheet through the meshes in the porous cross-laminated fabric by means of a T-die is 0.5 seconds or longer, the portions of that fabric laminated to the sheets are destroyed by heat, thus giving rise to considerable drops of tear strength and bending strength.

Parallels also hold as to how to provide the adhesive layer. For instance, now consider the laminate of the same layer structure except for the adhesive layer, which is prepared from the same materials according to the same recipes. If the fabric 1 and the flexible sheets 2a and 2'a provided on both sides thereof are formed into a completely integral laminate by the adhesive layers 3 provided on said both sides without leaving any unbonded portion, as is the case with the prior art, there are then considerable deteriorations of tear strength, impact perforation strength, resistance to curling, Gelbo test strength, drop strength and flatness besides a rise in the cost.

Inventive samples 1 to 7 were practically used for packaging rolled films, sheet-like photographic paper, etc., for testing. From the results of testing, it has been ascertained that accidents such as failures decrease. The larger of the weight, thickness and volume of the article to be packaged, the more significant this tendency.

TABLE 1-1

|  | Unit | Conventional Sample 1 | Conventional Sample 2 | Conventional Sample 3 |
|---|---|---|---|---|
| Total Thickness of Laminate | μm | 200 | 157 | 115 |
| Plain View of Cross-Laminated Fabric |  | — | — | — |
| Material of Flexible Sheet 2' or 2" |  | LDPE Film | Kraft Paper (35 g/m$^2$) | BKM Film |
| Thickness | μm | 50(C3) | 40 | 40(C4-5) |
| Material of Fabric 1 |  | Aluminum Foil | Aluminum Foil | Aluminum Foil |
| Thickness | μm | 7 | 7 | 7 |
| Aperture | % | 0 | 0 | 0 |
| Sectional Views of Layer Structure |  | — | — | — |
| Adhesive Layer 3 | μm | LDPE 15 | LDPE 20 | LDPE 15 |
| Material of Flexible Sheet 2' or 2" |  | Kraft Paper | LDPE Film | BKM Film |
| Thickness | μm | (35 g/m$^2$) | 70(C3) | 40(C4-5) |
| Material of Adhesive Layer 3 | μm | LDPE 15 | — | — |
| Material of Heat-Sealing Layer 5 |  | LDPE Film | — | — |
| Thickness | μm | 50(C3) |  |  |
| Resin Temperature of Layer 3 (°C.) |  |  |  |  |
| Time until Layer 3 contacts Cooling Roll (sec.) |  |  |  |  |

TABLE 1-2

|  | Unit | Comparative Example 1 | Inventive Sample 1 | Inventive Sample 2 |
|---|---|---|---|---|
| Total Thickness of Laminate | μm | 171 | 211 | 205 |
| Plain View of Cross-Laminated Fabric |  | FIG. 10 | FIG. 13 | FIG. 10 |
| Material of Flexible Sheet 2' or 2" |  | L-LDPE 85% LDPE 10% Carbon 4.5% Mixed Film | Biaxially Stretched PET Film | L-LDPE 85.5% LDPE 10% Carbon 4.5% Mixed Film |
| Thickness | μm | 50(4-5) | 20 | 50(4-5) |
| Material of Fabric 1 |  | HDPE | HDPE | HDPE |
| Thickness | μm | 70 | 80 | 70 |
| Aperture | % | 72 | 57 | 72 |
| Sectional View of Layer Structure |  | FIG. 1 | FIG. 1 | FIG. 2 |
| Adhesive Layer 3 | μm | LDPE 15 | LDPE 20 | LDPE 15 |
| Material of Flexible Sheet 2' or 2" |  | L-LDPE 85% LDPE 10% Carbon 4.5% Mixed Film | L-LDPE Film | L-LDPE 85.5% LDPE 10% Carbon 4.5% Mixed Film |

TABLE 1-2-continued

|  |  |  |  |  |
|---|---|---|---|---|
| Thickness |  | 50(4.5) | 70(4.5) | 50(4.5) |
| Material of Adhesive Layer 3 | μm | — | — | — |
| Material of Heat-Sealing Layer 5 / Thickness | μm | — | — | — |
| Resin Temp. of Layer 3 | °C. | 310 | 310 | 310 |
| Time until Layer 3 Contacts Cooling Roll | sec. | 0.6 | 0.1 | 0.1 |

|  | Unit | Comparative Example 1 | Inventive Sample 3 | Inventive Sample 4 |
|---|---|---|---|---|
| Total Thickness of Laminate | μm | 171 | 189 | 224 |
| Plain View of Cross-Laminated Fabric |  | FIG. 10 | FIG. 10 | FIG. 9 |
| Material of Flexible Sheet 2' or 2" |  | L-LDPE 85% / LDPE 10% / Carbon 4.5% } Mixed Film | L-LDPE 85.5% / LDPE 10% / Carbon 4.5% } Mixed Film | L-LDPE 85.5% / LDPE 10% / Carbon 4.5% } Mixed Film |
| Thickness | μm | 50(4.5) | 50(4.5) | 50(4.5) |
| Material of Fabric 1 |  | HDPE | HDPE | HDPE |
| Thickness of Fabric 1 | μm | 70 | 70 | 100 |
| Aperture | % | 72 | 72 | 47 |
| Sectional View of Layer Structure |  | FIG. 1 | FIG. 2 | FIG. 2 |
| Adhesive Layer 3 | μm | LDPE 15 | LDPE 15 | LDPE 15 |
| Material of Flexible Sheet 2' or 2" |  | L-LDPE 85% / LDPE 10% / Carbon 4.5% } Mixed Film | L-LDPE 85.5% / LDPE 10% / Carbon 4.5% } Mixed Film | L-LDPE 85.5% / LDPE 10% / Carbon 4.5% } Mixed Film |
| Thickness |  | 50(4.5) | 50(4.5) | 50(4.5) |
| Material of Adhesive Layer 3 | μm | — | — | — |
| Material of Heat-Sealing Layer 5 / Thickness | μm | — | — | — |
| Resin Temp. of Layer 3 | °C. | 310 | 310 | 310 |
| Time until Layer 3 Contacts Cooling Roll | sec. | 0.6 | 0.15 | 0.1 |

TABLE 1-3

|  | Unit | Inventive Sample 5 | Inventive Sample 6 | Inventive Sample 7 | Testing Method |
|---|---|---|---|---|---|
| Total Thickness of Laminate | μm | 227 | 206 | 198 | JISP8118 |
| Plain View of Cross-Laminated Fabric |  | FIG. 10 | FIG. 10 | FIG. 10 |  |
| Material of Flexible Sheet 2' or 2" |  | Laterally Uniaxially Stretched HDPE Film | Obliquely Uniaxially Molecularly Oriented Film | Obliquely Uniaxially Molecularly Oriented Film |  |
| Thickness | μm | 50(4.5) | 40(4.5) | 35(4.5) | JISP8118 |
| Material of Fabric 1 |  | HDPE | HDPE | HDPE |  |
| Thickness of Fabric 1 | μm | 70 | 70 | 70 | *(2) |
| Aperture | % | 72 | 72 | 72 | *(1) |
| Sectional View of Layer Structure |  | FIG. 2 | FIG. 2 | FIG. 6 |  |
| Adhesive Layer 3 | μm | LDPE 15 | LDPE 20 | EEA 20 | JISP8118 |
| Material of Flexible Sheet 2' or 2" |  | L-LDPE 85.5% / LDPE 10% / Carbon 4.5% } Mixed Film | Obliquely Uniaxially Molecularly Oriented Film | Obliquely Uniaxially Molecularly Oriented HDPE Film Vacuum-Deposited with 400Å Aluminum |  |
| Thickness | μm | 50(4.5) | 40(4.5) | 35(4.5) | JISP8118 |
| Material of Adhesive Layer 3 | μm | — | — | — | JISP8118 |
| Material of Heat-Sealing Layer 5 / Thickness | μm | — | — | — | JISP8118 |
| Resin Temp. of Layer 3 | °C. | 310 | 320 | 310 |  |
| Time until Layer 3 Contacts Cooling Roll | sec. | 0.1 | 0.1 | 0.1 |  |

*Remarks

TABLE 2-1

|  | Unit | Conventional Sample 1 | Conventional Sample 2 | Conventional Sample 3 | Comparative Example 1 |
|---|---|---|---|---|---|
| Total Thickness of Laminate | μm | 200 | 157 | 115 | 171 |
| Bonded Area | % | — | — | — | — |
| Tear Strength Longitudinal | g | 294 | 183 | 343 | 306 |
| Tear Strength Transverse | g | 610 | 278 | 496 | 341 |
| Impact Perforation Strength (Front) | kg·cm | 5.1 | 4.2 | 9.3 | 6.3 |
| Impact Perforation Strength (Rear) | kg·cm | 5.8 | 6.2 | 10.6 | 8.1 |
| Curling | cm | 2.5 | 18 | 8.7 | 13 |

TABLE 2-1-continued

| | Unit | Conventional Sample 1 | Conventional Sample 2 | Conventional Sample 3 | Comparative Example 1 |
|---|---|---|---|---|---|
| Drop Strength | times | 1 | 1 | 3 | 3 |
| Heat-Sealing Strength | kg/15 mm | 1.2 | 1.6 | 1.6 | 1.5 |
| Slip Angle (on the Contact Surface of Photosensitive Material) | degree | 19.3 | 17.2 | 13.0 | 16.2 |
| Wear Resistance (on the Surface of Photosensitive Material) | | D | D | A | D |

Evaluation: A: Very Excellent, B: Excellent, C: Practical Limit, D: Problematic, X: Unpractical

TABLE 2-2

| | Unit | Inventive Sample 1 | Inventive Sample 2 | Inventive Sample 3 | Inventive Sample 4 |
|---|---|---|---|---|---|
| Total Thickness of Laminate | μm | 211 | 205 | 189 | 224 |
| Bonded Area | % | | | | |
| Tear Strength Longitudinal | g | 1554 | 1600 or higher | 608 | 1600 or higher |
| Tear Strength Transverse | g | 1600 or higher | 1480 | 640 | 1600 or higher |
| Impact Perforation Strength (Front) | kg · cm | 18.3 | 22.6 | 19.1 | 25.6 |
| Impact Perforation Strength (Rear) | kg · cm | 19.7 | 23.3 | 17.2 | 24.8 |
| Curling | cm | 4.8 | 1.1 | 1.8 | 1.2 |
| Drop Strength | times | 5 | 8 | 6 | 9 |
| Heat-Sealing Strength | kg/15 mm | 2.6 | 2.2 | 2.0 | 2.3 |
| Slip Angle (on the Contact Surface of Photosensitive Material) | degree | 10.3 | 11.4 | 12.4 | 13.8 |
| Wear Resistance (on the Surface of Photosensitive Material) | | B | B | B | B |

Evaluation: A: Very Excellent, B: Excellent, C: Practical Limit, D: Problematic, X: Unpractical envelopes were found to package with a reduced rate of failures rolled articles having a weight of at least 5 kg, for instance, roll-films having a large diameter such as photographic paper, cinefilms, printing photosensitive films, X-ray films, etc., and sheet-like articles having a similar weight, in particular film edges such as those having a sharp edge. Thus, the products of the present invention are useful especially when such articles are packaged in the form of bags (flat or gusseted bags for transportation). In addition, due to proper rigidity, the inventive products were easily sealed at their open ends with tapes, and were completely sealed by heat-sealing with ease. In particular, the products having carbon black added to their inner layer showed the most excellent light-shielding properties.

MEASURING METHOD

1. Aperture Ratio $$\text{Aperatio Ratio (\%)} = \frac{X \text{ cm}^2}{100 \text{ cm}^2} \times 100$$

wherein X is the area in cm² of the apertures included in a square area of 100 cm² in the porous cross-laminated fabric.

2. Thickness of Porous Cross-Laminated Fabric According to JIS L-1079-1966.

3. Curling

Test pieces in the round form of a diameter of 10 cm

TABLE 2-3

| | Unit | Inventive Sample 5 | Inventive Sample 6 | Inventive Sample 7 | Testing Method |
|---|---|---|---|---|---|
| Total Thickness of Laminate | μm | 227 | 206 | 198 | JISP8118 |
| Bonded Area | % | | | | |
| Tear Strength Longitudinal | g | 1600 or higher | 1600 or higher | 1079 | JISP8116 |
| Tear Strength Transverse | g | 1360 | 1600 or higher | 1600 or higher | |
| Impact Perforation Strength (Front) | kg · cm | 23.8 | 27.3 | 19.8 | JISP8134 |
| Impact Perforation Strength (Rear) | kg · cm | 24.3 | 26.8 | 18.4 | |
| Curling | cm | 2.6 | 1.3 | 2.3 | *(3) |
| Drop Strength | times | 6 | 8 | 7 | *(4) |
| Heat-Sealing Strength | kg/15 mm | 2.2 | 2.4 | 1.9 | *(5) |
| Slip Resistance (on the Contact Surface of Photosensitive Material) | degree | 12.1 | 13.2 | 16.1 | *(6) |
| Wear Resistance (on the Surface of Photosensitive Material) | | B | A | A | *(7) |

*Remarks
Evaluation:
A: Very Excellent,
B: Excellent,
C: Practical Limit,
D: Problematic,
X: Unpractical That is to say, the laminate samples of the present invention were cut out in the rectangular form, and were sealed at their three sides to form envelopes. The were prepared from the sheets to be tested, and were allowed to JIS level II was effected to inspect the degree of damage on the surface of the sheets. to stand alone discretely on a flat plate for 24 hours in the absence of any load and in an atmosphere of 20° C. and a humidity of 65%. Thereafter, a distance 1 between both ends of each test piece was measured. Curling is expressed in terms of 10-1 (cm).

4. Drop Strength

One-kg sand was charged in a bag made of a packaging material. That bag was repeatedly dropped from a height of 1 m onto a floor to determine the number of dropping by the time it was destroyed.

5. Heat-Sealing Strength
Sealing Condition: Pressure 1 kg 1 second
Measuring Conditions:
   Rate of Pulling 30 mm/min
   Chuck Spacing 10 cm with a Strograph manufactured by Toyo Seiki, 6. Slip Angle A part of the sheet to be tested was cut out, and was applied to the bottom of a 75×35-mm block having a load of 200 g. On the other hand, a part of the sheet to be tested was similarly cut out, and was applied to a slant surface, the slant angle of which was varied to read the angle at which said block started to slip.

7. Wear Resistance

The aforesaid two laminated sheets were formed into bags, in which an article having a weight of 5 kg was put, sealed and packaged. Thereafter, vibration testing according to JIS level II was efected to inspect the degree of damage on the surface of the sheets.

What is claimed is:

1. A packaging material for photosensitive materials comprising a laminate of at least three layers comprising thermoplastic resin bonded fabric of mesh structure and flexible sheet layers laminated on both sides thereof, wherein:
   (a) said thermoplastic resin bonded fabric of mesh structure has a mean thickness of 0.01 to 1.3 mm,
   (b) said thermoplastic resin bonded fabric of mesh structure has an aperture ratio of 15% to 98%,
   (c) said laminate including one or two or more light-shielding layers, and
   (d) only one layer of said flexible sheet layers on both sides of said thermoplastic resin bonded fabric of mesh structure has been applied with an adhesive layer, and the other (opposite) flexible sheet layer is bonded and laminated over at least 10% of the overall area through the apertures or meshes in said fabric.

2. A packaging material for photosensitive materials as defined in claim 1, in which said one or two or more light-shielding layers are any one of a metal foil layer having a thickness of 5 to 50 microns, a metal-deposited layer having a thickness of 100 to 1200 Å, or a layer containing 1 to 30% by weight of a light-shielding substance.

3. A packaging material for photosensitive materials as defined in claim 1, in which the surface of said flexible sheet layers laminated on said bonded fabric, which is to come in contact with a photosensitive material, is formed of a heat-sealable thermoplastic resin film which has a melting point lower than that of said bonded fabric by at least 10° C.

4. A packaging material for photosensitive materials as defined in claim 3, in which said thermoplastic resin film is applied on the flexible sheet layer laminated on the side of said bonded fabric, which is to come in contact with a photosensitive material.

5. A packaging material for photosensitive materials as defined in claim 1, in which at least the flexible sheet layer laminated on the side to come in contact with a photosensitive material has a coefficient of static friction of at most 0.466 and a slip angle of no more than 25°.

6. A packaging material for photosensitive materials as defined in claim 1, in which said flexible sheet layers laminated on both sides of said bonded fabric are formed of an obliquely and uniaxially molecularly-oriented high-density polyethylene film, and have their axes of molecular orientation intersecting each other.

7. A packaging material for photosensitive materials as defined in claim 1, in which at least the surface of one of said flexible sheet layers laminated on both sides of said bonded fabric, which is to come in contact with a photosensitive material, is formed of an L-LDPE film layer.

8. A packaging material for photosensitive materials as defined in claim 7, in which said flexible sheet layer laminated on the side to be directed a packaged photosensitive material has a melting point than that of the outer flexible sheet layer by at least 5° C.

9. A packaging material as defined in claim 1, wherein the packaging material has a total thickness of 0.05-2.0 mm.

10. A packaging material as defined in claim 1, wherein the aperture ratio of the bonded fabric is 25-85%.

11. A packaging material as defined in claim 9, wherein the aperture ratio of the bonded fabric is 35-80%.

12. A packaging material as defined in claim 1, wherein the other flexible sheet is bonded over at least 50% of the overall area.

13. A packaging material as defined in claim 1, which further comprises at least one additional layer laminated thereon.

14. A process for producing packaging materials for photosensitive materials consisting of an at least three-layer laminate comprising thermoplastic resin bonded fabric of mesh structure and flexible sheet layers laminated on both sides thereof, comprising:
   (1) providing termoplastic resin bonded fabric of mesh structure having a mean thickness of 0.03 to 0.9 mm and an aperture ratio of 15% to 98%,
   (2) providing within said laminate one or two or more layers comprising any one of a metal foil having a thickness of 5 to 50 microns, a metal-deposited layer having a thickness of 100 to 1200 Å or a layer containing 0.1 to 30% by weight of a light-shielding substance,
   (3) applying an adhesive layer on only one of said flexible sheet layers to be disposed on both sides of said thermoplastic resin bonded fabric of the mesh structure, and
   (4) through said adhesive layer laminating said flexible sheet layer on said bonded fabric in such a condition that the other flexible sheet layer is bonded on the opposite side over at least 10% of the overall area through the apertures or meshes in said fabric.

15. A process for producing packaging materials for photosensitive materials as defined in claim 14, in which said adhesive layer comprises a thermoplastic resin having a temperature of at most 350° C. at the time of applying the adhesive layer, and, after coming in contact with said bonded fabric, is allowed to come in contact with cooling means of no higher than 50° C. within 0.5 seconds.

16. A process for producing packaging materials for photosensitive material as defined in claim 14, in which said thermoplastic resin bonded fabric of mesh structure is prepared by a fiber splitting process.

17. A process for producing packaging materials for photosensitive material as defined in claim 14, in which said thermoplastic resin bonded fabric of mesh structure is a porous cross-laminated fabric.

* * * * *